US009903428B2

(12) United States Patent
Reulein

(10) Patent No.: US 9,903,428 B2
(45) Date of Patent: Feb. 27, 2018

(54) CONNECTING MEANS FOR BRAKE DISC ASSEMBLY

(71) Applicant: BREMBO SGL CARBON CERAMIC BRAKES GMBH, Meitingen (DE)

(72) Inventor: Harald Reulein, Megesheim (DE)

(73) Assignee: BREMBO SGL CARBON CERAMIC BRAKES GMBH, Meitingen (DE)

( * ) Notice: Subject to any disclaimer, the term of this patent is extended or adjusted under 35 U.S.C. 154(b) by 0 days.

(21) Appl. No.: 15/104,315

(22) PCT Filed: Dec. 9, 2014

(86) PCT No.: PCT/EP2014/077018
§ 371 (c)(1),
(2) Date: Jun. 14, 2016

(87) PCT Pub. No.: WO2015/091101
PCT Pub. Date: Jun. 25, 2015

(65) Prior Publication Data
US 2016/0319893 A1    Nov. 3, 2016

(30) Foreign Application Priority Data
Dec. 20, 2013   (EP) ..................... 13198846

(51) Int. Cl.
*F16D 65/12* (2006.01)
*F16D 65/02* (2006.01)

(52) U.S. Cl.
CPC ......... *F16D 65/123* (2013.01); *F16D 65/126* (2013.01); *F16D 2065/1316* (2013.01);
(Continued)

(58) Field of Classification Search
CPC ............... F16D 65/12; F16D 2065/136; F16D 2065/1316; F16D 2065/1392
(Continued)

(56) References Cited

U.S. PATENT DOCUMENTS 2,353,943 A * 7/1944 Storch ................... F16F 1/3732
                                                267/141.4
2,382,372 A * 8/1945 Wallerstein, Jr. ..... F16F 3/0873
                                                267/140.2
(Continued)

FOREIGN PATENT DOCUMENTS

DE    19859616 A1    7/2000
DE    19940570 A1    3/2001
DE    10305236 A1    8/2004

OTHER PUBLICATIONS

International Search Report dated Mar. 2, 2015 in corresponding application No. PCT/EP2014/077018; 2 pgs.

*Primary Examiner* — Christopher Schwartz
(74) *Attorney, Agent, or Firm* — Maier & Maier, PLLC

(57) ABSTRACT

A brake disc assembly including a brake disk ring, a bell and a connecting mechanism between the brake disk ring and the bell, wherein the connecting mechanism includes a form-locked and/or force-locked connecting element in an axial direction DO of the brake disc ring, the connecting mechanism comprises a bushing for the connecting element and a distance element arranged between the brake disk ring and the bell, wherein the bushing includes a shoulder and a loss prevention, wherein the bushing further includes a region A1 provided for the brake disk ring and a region A2 provided for the bell, wherein the region A1 has an average expansion E4 in an direction perpendicular to DO and the region A2 has an average expansion E2 in an direction perpendicular to DO.

9 Claims, 4 Drawing Sheets

Figure 1A:
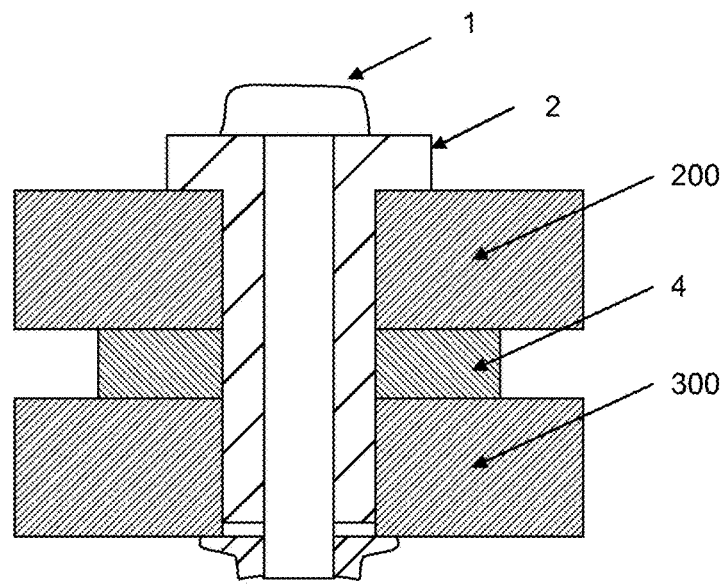

(52) U.S. Cl.
CPC ............... *F16D 2065/1348* (2013.01); *F16D 2065/1364* (2013.01); *F16D 2065/1392* (2013.01); *F16D 2200/0021* (2013.01); *F16D 2200/0052* (2013.01)

(58) Field of Classification Search
USPC ..... 248/635; 267/140.2–140.5, 141.1–141.7, 267/293, 294; 296/35.1, 190.07; 188/218 A, 218 R, 218 XL
See application file for complete search history.

(56) References Cited

U.S. PATENT DOCUMENTS

| | | | |
|---|---|---|---|
| 3,128,999 A * | 4/1964 | Schmitt | F16B 5/0233 267/153 |
| 4,286,777 A * | 9/1981 | Brown | B60G 99/004 248/635 |
| 6,098,764 A * | 8/2000 | Wirth | F16D 65/123 188/218 XL |
| 6,267,210 B1 * | 7/2001 | Burgoon | F16D 65/0006 188/218 XL |
| 6,374,956 B1 * | 4/2002 | Naeumann | F16D 55/40 188/18 A |
| 6,416,030 B1 * | 7/2002 | Bergdahl | B62D 27/04 248/635 |
| 7,261,365 B2 * | 8/2007 | Dickson | B60G 99/002 248/635 |
| 7,435,179 B1 | 10/2008 | Ford | |
| 7,770,699 B2 * | 8/2010 | Schlitz | F16D 65/12 188/18 A |
| 7,922,586 B2 | 4/2011 | Heckendorf et al. | |
| 7,946,919 B2 | 5/2011 | Piccionelli | |
| 8,550,916 B2 | 10/2013 | Raynal | |
| 8,651,247 B2 * | 2/2014 | Burgoon | F16D 65/123 188/18 A |
| 8,702,515 B2 | 4/2014 | Weston et al. | |
| 8,721,460 B2 | 5/2014 | Rosenblum | |
| 2002/0111201 A1 | 8/2002 | Lang | |
| 2003/0224855 A1 | 12/2003 | Cunningham | |
| 2005/0049022 A1 | 3/2005 | Mullen | |
| 2007/0167224 A1 | 7/2007 | Sprogis | |
| 2008/0220693 A1 | 9/2008 | Cuisinier | |
| 2009/0017913 A1 | 1/2009 | Bell et al. | |
| 2011/0312418 A1 | 12/2011 | Page | |
| 2013/0072308 A1 | 3/2013 | Peck | |

\* cited by examiner

CONNECTING MEANS FOR BRAKE DISC ASSEMBLY

The present invention relates to a brake disc assembly comprising a brake disc ring and a bell and specifically to the connecting means for connecting the brake disc ring with the bell. Such two-part brake disc assemblies, i.e. the brake disc is not of one piece, are needed when the material of the brake disc ring is different to the material of the bell, as for example in carbon/ceramic brake discs. In such brake discs, the brake disc ring usually is composed of a friction material like carbon fibre reinforced carbon-silicon carbide (C/SiC) and the bell is usually composed of a metal like steel or aluminum. The connecting means of the present invention is, however, not limited to the material of the parts of the brake disc assembly.

There are generally two kinds of connecting means, a flexible and a tight one. In the flexible kind a spring is used. Since the fixture with a spring has the effect of a relatively high NVH-level (Noise, Vibration and Harshness), the present invention more specifically relates to tight connecting means.

Generally, tight connecting means comprise a connecting element, like a screw and nut, as well as a bushing which surrounds the connecting element. In the following, two kinds of such tight connecting elements known in the art are described.

In DE 19940570 A1 a connecting means is described consisting of a screw (1) and a bushing (2). This connecting means is also shown in FIG. 1b of the present application. The numbers in brackets refer to the figures of the present application. The bushing has two plane sections (7,8), the first one at one end of the bushing, opposite to the head of the screw (1) and holding the bell (200), and the second one arranged between the bell and the brake disc ring (300). The head of the screw holds the brake disc ring. The inside of the bushing has a thread of screw (6) at the region of the first plane section. Finally, there is a cut (5) provided between first and second plane section going through about half of the bushing. When the screw is tightened, the bushing is bended to the side of the cut (5) and the plane sections (7,8) move towards each other and hold the bell. Consequently, at the side of the bushing opposite to the cut, the plane sections (7,8) move away from each other.

This system has the advantage that, if the screw is lost during operation, the bushing cannot be lost, because of the plane section (7) which has the function of a loss prevention. However, the force applied from the plane section (8) to the bell is asymmetric. This results in a line load working on the bell which, in comparison to an area load, generally has disadvantages with regard to the stability and finally to the life time of the brake disc. Another disadvantage is that the screw also suffers bending stress.

Figure 1B:
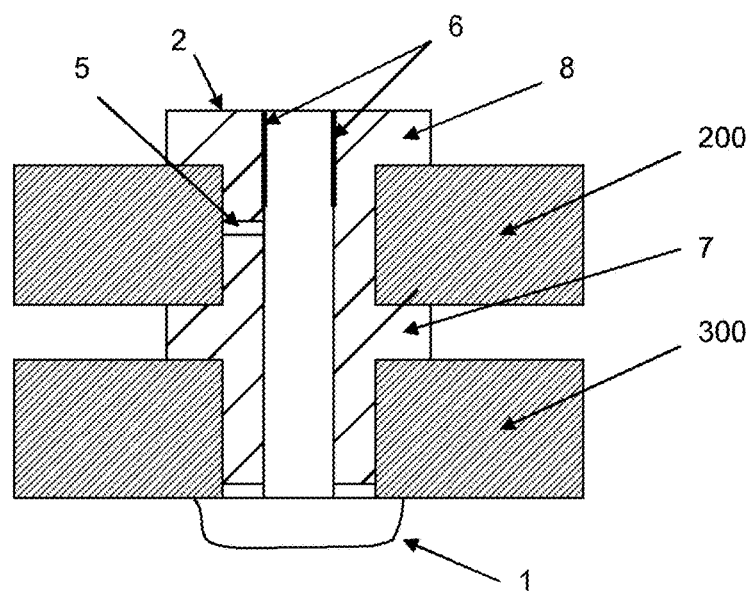

The second known kind of tight connecting elements known in the art is shown in FIG. 1a. The bushing (2) has only one plane section at the end and at the side of the bell (200). The assembly is held together by a screw (1) and a nut. Between the bell (200) and the brake disc ring (300) a distance element (4) is provided having the function of thermal isolation. This connecting means is advantageous to the one described in DE 19940570 A1 due to a homogenous load distribution, however, it has no loss prevention of the bushing. Once the screw is lost, the bushing is lost as well.

Therefore, there is a need for a connecting means for brake disc assemblies which does overcome the drawbacks of the prior art. The problem of the present invention is to provide a connecting means which exhibits a homogeneous area force to both, brake disc ring and bell, which has a low NVH-level and which provides a loss prevention of the bushing.

The problem has been solved by the provision of a brake disc assembly according to claim 1 of the present application.

The reference numbers in brackets refer to the following figures:

FIGS. 1a and 1b: Schematic cross sections of connecting means of the prior art.

Figure 2:
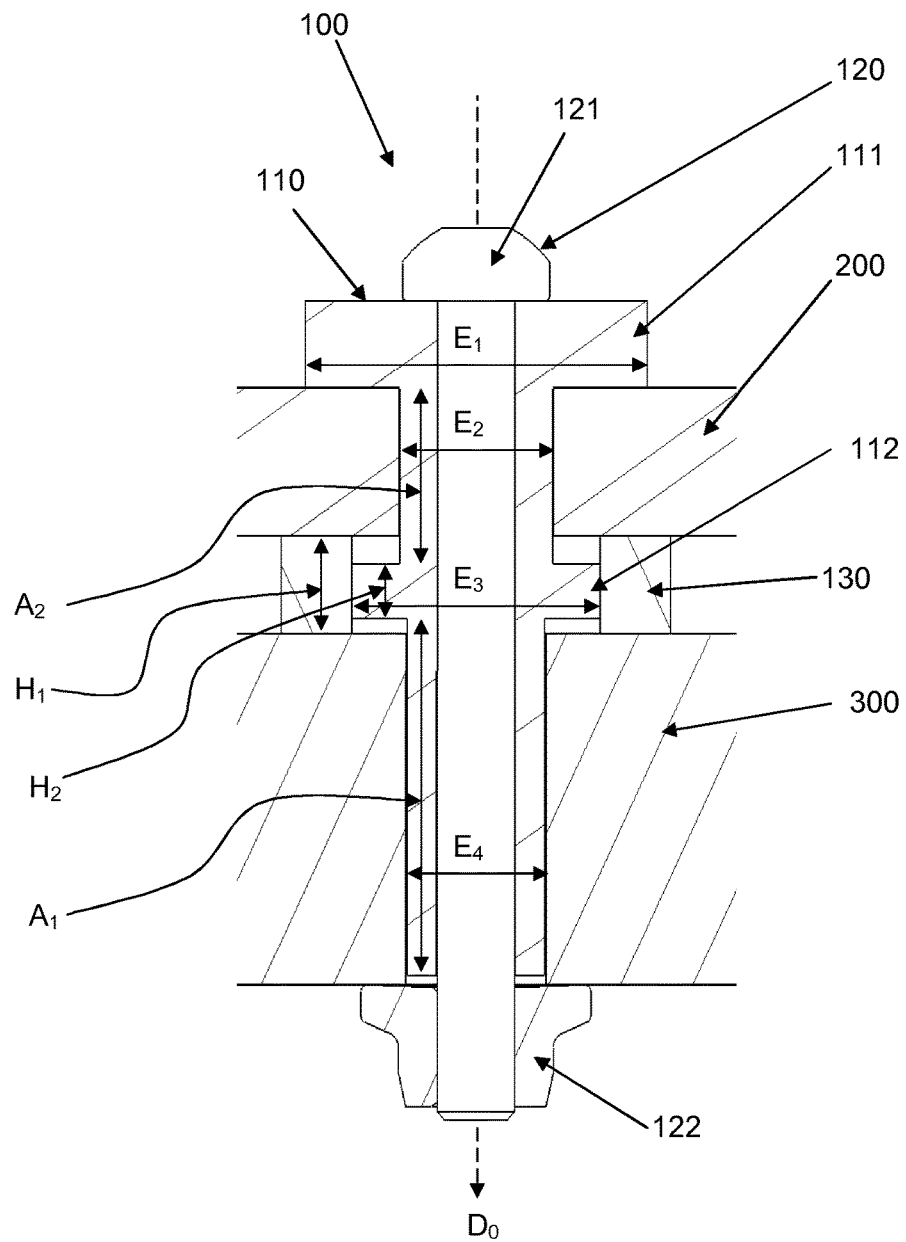

FIG. 2: A schematic view on the cross section of the connecting means according to the present invention. The proportions and dimensions shown in the figure are of illustrative purpose only and do not limit the scope of the present invention.

Figure 3:
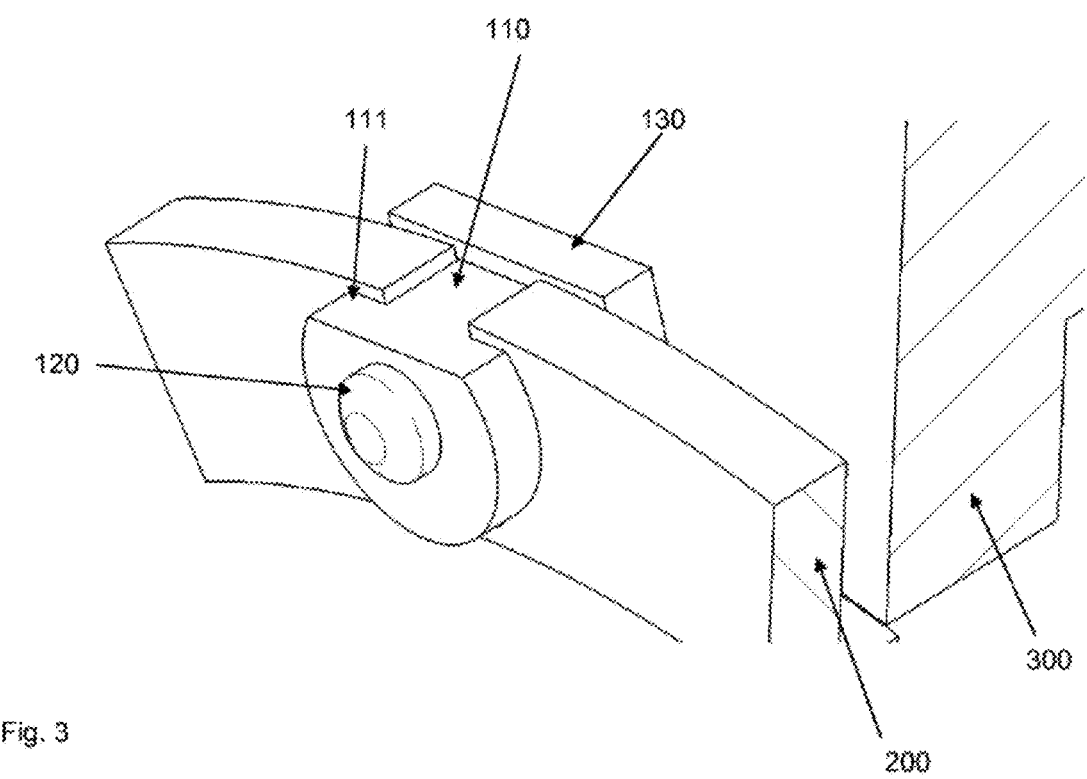

FIG. 3: A perspective view of the connecting means according to the present invention. The proportions and dimensions shown in the figure are of illustrative purpose only and do not limit the scope of the present invention.

Figure 4:
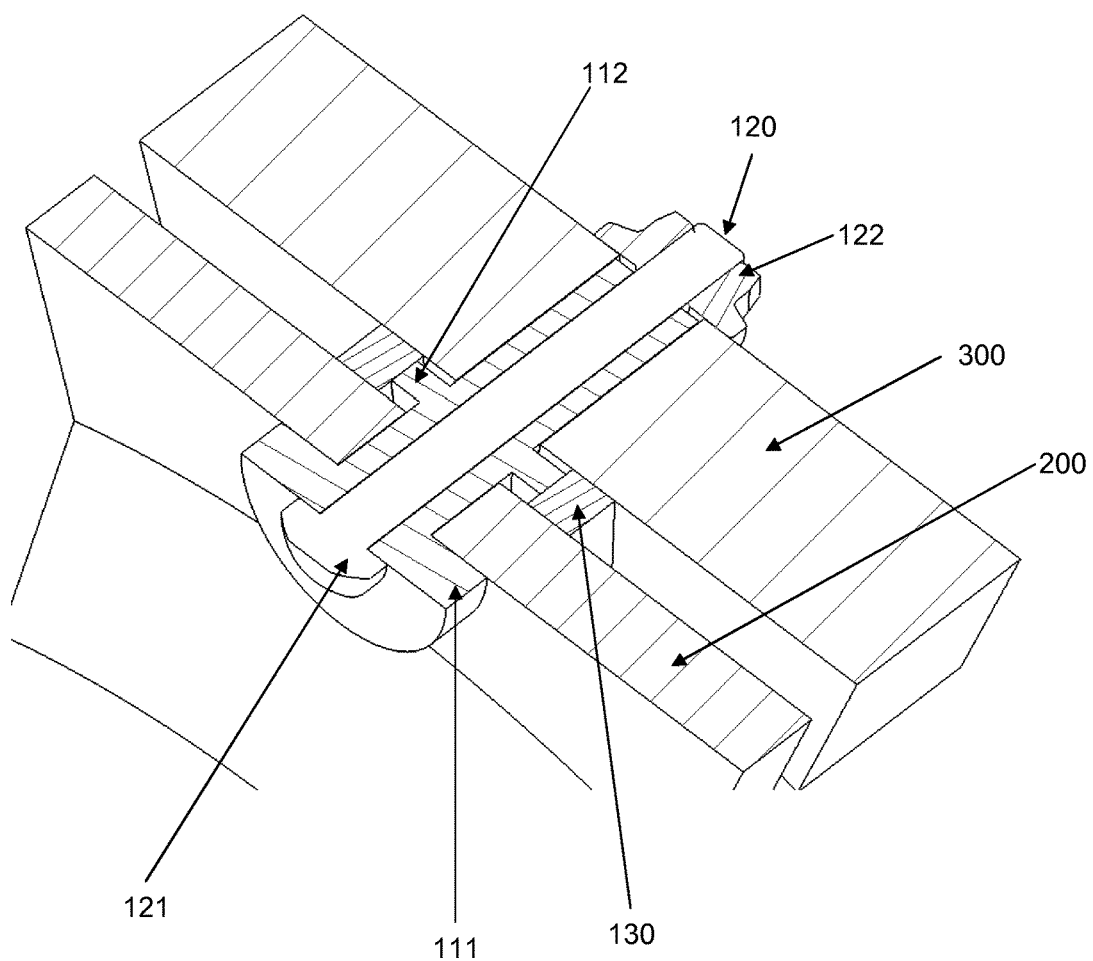

FIG. 4: A perspective view on the cross section of the connecting means according to the present invention. The proportions and dimensions shown in the figure are of illustrative purpose only and do not limit the scope of the present invention.

The brake disc assembly of the invention comprises a brake disk ring (300), a bell (200) and a connecting means (100) between the brake disk ring (300) and the bell (200), wherein the connecting means (100) comprises a form-locked and/or force-locked connecting element (120) in an axial direction D0 of the brake disc ring (300). The connecting element is not particularly limited, preferred is a screw.

The connecting means (100) of the present invention further comprises a bushing (110) for the connecting element (120) and a distance element (130) arranged between the brake disk ring (300) and the bell (200). The bushing (110) comprises a shoulder (111) and a loss prevention (112). The bushing (110) further comprises a region A1 provided for the brake disk ring (300) and a region A2 provided for the bell (200), wherein the region A1 has an average expansion E4 in an direction perpendicular to D0 and the region A2 has an average expansion E2 in a direction perpendicular to D0. The loss prevention (112) has an average expansion E3 in a direction perpendicular to D0 and the shoulder (111) has an average expansion E1 in a direction perpendicular to D0. According to the invention, E2 is smaller than each of E1 and E3.

Furthermore, according to the present invention the height H1 of the distance element (130) is bigger than the height H2 of the loss prevention (112).

Finally, in an assembled state, the loss prevention (112) is neither in direct contact with the brake disk ring (300) nor with the bell (200) and the brake disk ring (300) protrudes over the region A1.

The connecting means of the present invention overcomes all the disadvantages of those of the prior art. The connecting force applied from the shoulder (111) onto the bell (200) represents a homogeneous area load, since the bushing is not bended when the screw is tightened. Furthermore, the bushing cannot be lost, since it has a loss prevention (112). These two advantages were only provided by multi-part systems, in most cases having springs. The solution of the present invention, however, exhibits a far lower NVH-level than those multi-part systems.

The principle of the connecting means of the present invention does not depend on the materials used. Therefore, all known materials in the art can be used as the material for the connecting means. Preferably, however, steel, preferably inox steel is used at least for the bushing and the distance element.

When the brake disc is assembled, the distance element (130) is positioned over the loss prevention (112). To facilitate this, the changeover from E4 to E3 at the bushing (110) preferably comprises a bevel.

The distance element (130) is preferably formed as a plate having a homogeneous thickness defined by the height H1 and having a hole provided for the loss prevention (112). During assembling, the distance element (130) is pulled over the bushing at the region A1 and then over the loss prevention (112). The preferred bevel at the changeover from E4 to E3 assists that the loss prevention (112) fits in the hole of the distance element. This is even more advantageous when, according to a preferred embodiment of the present invention, the inner contour of the hole of the distance element (130) corresponds to the outer contour of the loss prevention (112). Even more preferably, both contours are designed in a way that the rotation of the distance element (130) around the loss prevention (112) is avoided by form-locking. In this embodiment, the only function of the loss prevention (112) during normal operation of the brake disc assembly is the function of a guiding system for the distance element (130). The loss prevention (112) preferably does not transmit any of the connecting forces. Thus, the transmission path of the force provided by the connecting element (120) preferably goes from one end (121) of the connecting element (120) to the shoulder (111), from the shoulder to the bell (200), from the bell to the distance element (130), from the distance element to the brake disc ring (300) and finally from the brake disc ring to the other end (122) of the connecting element.

Preferably, the interface between the bell (200) and the bushing at the region A2 preferably has play and also the interface between the brake disk ring (300) and the bushing at the region A1 preferably has play. This means that the parts of the interface are in contact to each other, but not in a force-locked manner.

Also the interface between the distance element (130) and the loss prevention (112) of the bushing (110) preferably has play.

In the embodiment, where the distance element (130) is preferably formed as a plate with a hole, the outer contour of the distance element is not particularly limited but depends on the available design space provided by the brake disc assembly. It can be rectangular or round or can have a more complex design which is preferably adapted to design space in the brake disc assembly.

The outer contour of the loss prevention (112) is not particularly limited. Preferably, it has a round shape with a flat portion in order to prevent rotation of the distance element around the loss prevention. However, other designs to fulfil this requirement are also possible. The design of the hole of the distance element thereby preferably corresponds to the design of the loss prevention.

Preferably, the shape of the bushing (110) at the region A1 is cylindrical. This is because the simplest way to machine a hole into the brake disc ring provided for the bushing is a bore.

Preferably, the outer contour of the cross section of the bushing perpendicular to D0 and at the region A2 is rectangular. This is because the bell comprises slots at the outer circumference, wherein the bushing is put in at region A2. With a rectangular shape, rotation of the bushing in the slot of the bell is prevented. However, other designs to fulfil this requirement are also possible.

Depending on the intended dimensions of the brake disc, length of the bushing (110) is preferably between 2 to 8 cm.

In order to provide sufficient temperature isolation between the bell and the brake disc ring the height H1 is preferably 2 to 6 mm, more preferably 2.5 to 4 mm.

The invention claimed is:

1. A brake disc assembly comprising:
   a brake disk ring, a bell and a connecting mechanism between the brake disk ring and the bell, wherein the connecting mechanism comprises a form-locked and force-locked connecting element in an axial direction (DO) of the brake disc ring,
   wherein the connecting mechanism comprises a bushing for the connecting element and a distance element arranged between the brake disk ring and the bell, wherein the bushing comprises a shoulder and a loss prevention, wherein the bushing further comprises a brake disc ring region (A1) provided for the brake disk ring and a bell region (A2) provided for the bell, wherein the brake disc ring region (A1) has an average brake disc ring region expansion (E4) in an direction perpendicular to the axial direction of the brake disc ring (DO) and the bell region (A2) has an average bell region expansion (E2) in an direction perpendicular to the axial direction of the brake disc ring (DO), and wherein the loss prevention has an average loss prevention expansion (E3) in an direction perpendicular to the axial direction of the brake disc ring (DO) and the shoulder has an average shoulder expansion (E1) in an direction perpendicular to the axial direction of the brake disc ring (DO), wherein the average bell region expansion (E2) is smaller than each of the average shoulder expansion (E1) and the average loss prevention expansion (E3), and wherein the height (H1) of the distance element is bigger than the height (H2) of the loss prevention, and wherein, in an assembled state, the loss prevention is neither in direct contact with the brake disk ring nor with the bell and the brake disk ring protrudes over the brake disc ring region (A1).

2. The brake disc assembly according to claim 1, wherein the distance element is formed as a plate having a homogeneous thickness defined by the height (H1) of the distance element and having a hole provided for the loss prevention.

3. The brake disc assembly according to claim 2, wherein the inner contour of the hole corresponds to the outer contour of the loss prevention and that both contours are designed in a way that the rotation of the distance element around the loss prevention is avoided by form-locking.

4. The brake disc assembly according to claim 1, wherein the changeover from the brake disc ring region expansion (E4) to the average loss prevention expansion (E3) at the bushing comprises a bevel.

5. The brake disc assembly according to claim 1, wherein the interface between the bell and the bushing at the bell region (A2) has play and wherein the interface between the brake disk ring and the bushing at the brake disc ring region (A1) has play.

6. The brake disc assembly according to claim 1, wherein the shape of the bushing at the brake disc ring region (A1) is cylindrical.

7. The brake disc assembly according to claim 1, wherein the outer contour of the cross section of the bushing perpendicular to the axial direction of the brake disc ring (DO) and at the bell region (A2) is rectangular.

8. The brake disc assembly according to claim 1, wherein the length of the bushing is 2 cm to 8 cm.

9. The brake disc assembly according to claim 1, wherein the height (H1) of the distance element is 2 mm to 6 mm, preferably 2.5 mm to 4 mm.

* * * * *